United States Patent
Vafiadis et al.

(10) Patent No.: US 7,292,244 B2
(45) Date of Patent: Nov. 6, 2007

(54) SYSTEM AND METHOD FOR AUTOMATIC LABEL PLACEMENT ON CHARTS

(75) Inventors: Miltiadis Vafiadis, Redmond, WA (US); Maneesh Agrawala, Seattle, WA (US); Adam Clyde Eversole, Redmond, WA (US); Daniel Philip Cory, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 154 days.

(21) Appl. No.: 10/968,619

(22) Filed: Oct. 18, 2004

(65) Prior Publication Data

US 2006/0082594 A1    Apr. 20, 2006

(51) Int. Cl.
- *G06T 11/20* (2006.01)
- *G09G 5/00* (2006.01)
- *G06F 3/048* (2006.01)

(52) U.S. Cl. ............... 345/440; 345/619; 345/629; 715/788

(58) Field of Classification Search ........ 345/440–441, 345/581, 648, 629, 649, 587, 619; 715/763, 715/764, 788, 866, 517, 512, 700, 794
See application file for complete search history.

(56) References Cited

U.S. PATENT DOCUMENTS

| | | | | |
|---|---|---|---|---|
| 5,724,072 A | * | 3/1998 | Freeman et al. | 345/648 |
| 6,154,219 A | * | 11/2000 | Wiley et al. | 345/581 |
| 7,010,751 B2 | * | 3/2006 | Shneiderman | 715/764 |
| 7,131,060 B1 | * | 10/2006 | Azuma | 715/512 |
| 2004/0252137 A1 | * | 12/2004 | Gelber | 345/629 |
| 2005/0270299 A1 | * | 12/2005 | Rasmussen et al. | 345/552 |

* cited by examiner

*Primary Examiner*—Kee M. Tung
*Assistant Examiner*—Chante Harrison
(74) *Attorney, Agent, or Firm*—Merchant & Gould P.C.

(57) ABSTRACT

An algorithm is provided for optimizing the layout of labels associated with a visual data object such as a chart. The labels are first placed into a chart definition file that defines the labels as a shape. An initial layout of the labels is created and scored. The shapes are then manipulated iteratively until an optimal layout of the labels is obtained that corresponds to the layout having the score closest to an optimal score. The optimal layout is then used in rendering the visual data object on a screen.

21 Claims, 6 Drawing Sheets

600
OPTIMIZATION
ALGORITHM procedure LabelOP()
1 InitializeLayout()
2 E = ScoreLayout()
3 while(! termination condition)
4 PerturbLayout()
5 newE = ScoreLayout()
6 if ((newE > E) and (Random() < (1.0 - $e^{-\Delta E/T}$ )))
    7 RevertLayout()
8 else
    9 E = newE
10 Decrease(T)

SYSTEM AND METHOD FOR AUTOMATIC LABEL PLACEMENT ON CHARTS

CROSS-REFERENCE TO RELATED APPLICATIONS

The present invention is related to a patent application having Ser. No. 10/941,566, entitled "Common Charting Using Shapes", filed on Sep. 15, 2004. The related application is assigned to the assignee of the present patent application and is hereby incorporated by reference.

BACKGROUND OF THE INVENTION

A chart is a graphical representation of numerical data. Charts are particularly useful for presenting complicated data in a concise and easily-understandable form. In today's desktop publishing environment, users can create impressive presentations using charts. Charts are based on underlying data that is entered into an application program such as "EXCEL" from MICROSOFT CORPORATION of Redmond, Wash. The underlying data can then be used to create a chart of the data in a number of different formats, such as pie-chart, bar-chart, histogram, line chart, etc. In addition, each part of the chart can have associated colors, textures, and other effects to improve the appearance of the chart, which is very important for conveying information.

The labels included in a chart contribute to the visual function and presentation of a chart. A chart with more than a few data points may become hard to read if the user activates an automated data label function. Generally, previously provided automated chart labeling algorithms result in overlapping text and positioning of labels that is not optimized to use the chart area. Accordingly, alternate methods are needed.

SUMMARY OF THE INVENTION

Embodiments of the present invention are related to a system and method that solves for the above-mentioned limitations by optimizing the placement of labels on charts and graphs. The optimization of the label is provided according to an algorithm that scores a specified positioning of the labels based on a set of constraints. The better the current positioning of the labels conforms with the stated constraints, the better the score for the chart. The algorithm attempts to minimize the score by calling a function multiple times, wherein the function repositions a single label each time it is called. In one implementation of the present invention, labels that were manually positioned are exempt from consideration during the optimization process.

In one aspect of the present invention, the functions of the optimization process are defined according to an objective function, or score function, and perturbation function that operate on the labels and anchors of the chart or graph. An anchor refers to a display element of the chart that has an associated label, such as a specific slice of a pie chart, a bubble of a bubble chart, or other elements depending on the chart used. The objective function refers to a function that defines the goal of the optimization by which a chart may be scored. For example, an objective function may correspond to minimizing overlap of labels, minimizing distance from the edge of an anchor, other goals for optimizing the position of the labels, and possible combinations of these goals. The perturbation function refers to a function that defines the limitations for the adjustment of the labels on the chart. For example, the perturbation function may define range limitations for relocating a label, a limited subset of the types of changes that may be made with regard to a label, and other limitations.

BRIEF DESCRIPTION OF THE DRAWINGS

FIG. 6 illustrates exemplary pseudo-code for determining the layout of a visual data object that corresponds to the optimal layout of the labels in accordance with the present invention.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
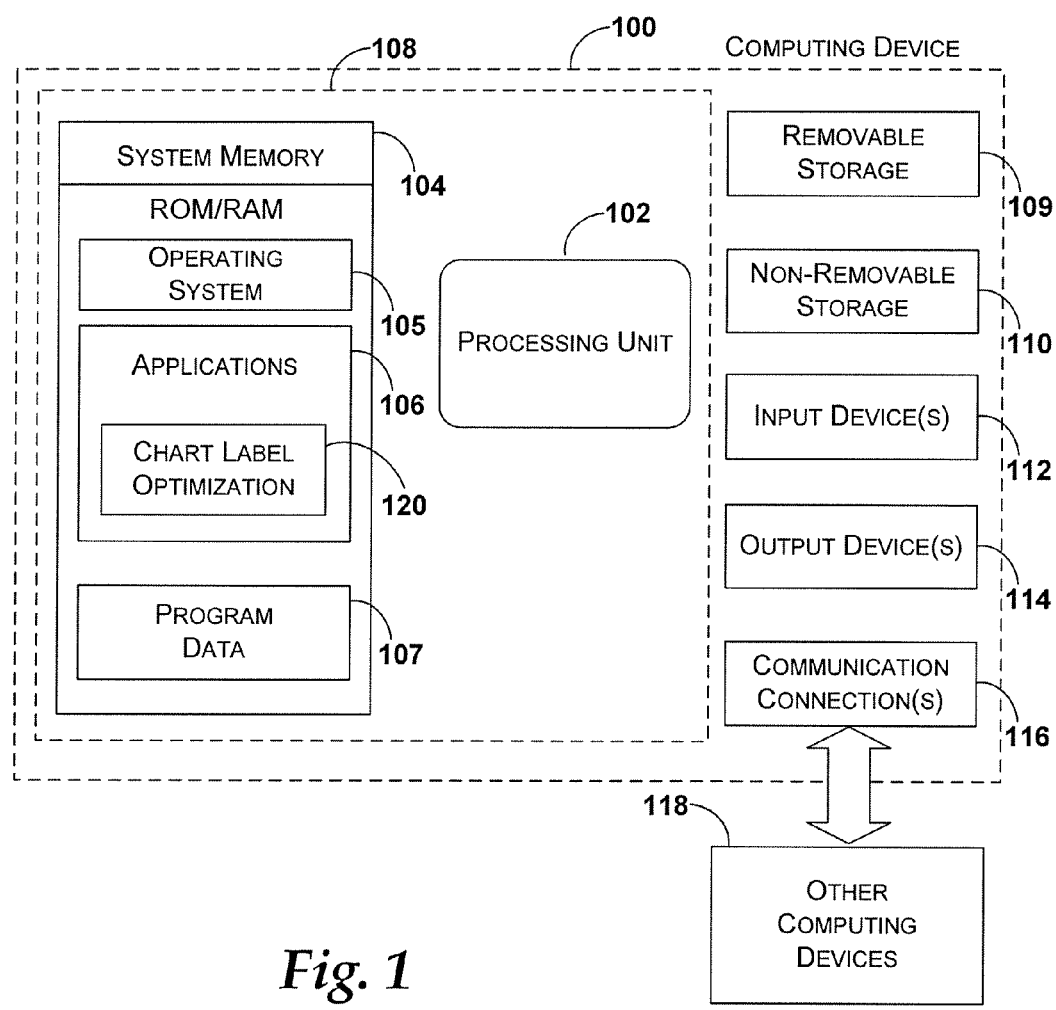
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a chart label optimization application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiment for Optimizing Automatic Label Placement

As used herein, the terms "chart" and "visual data object" are used interchangeably to describe various visual objects such as pie charts, bubble charts, line charts, timelines, line graphs, bar graphs, photographs, digital images, and other objects that may have associated labels.

Embodiments of the present invention are related to using an algorithm for optimizing the positions of labels on a chart. The present invention uses functions to search for an optimal layout of the labels from a set of possible layouts. To frame the layout problem as a search the present invention defines an initial layout and two functions: an objective function that assesses the quality of a layout based on evaluation criteria, and a perturb function that manipulates a given layout to produce a new layout within the search space. Both the score and the perturb functions are defined by the set of constraints on the layout. Given these two functions the search can be performed to determine the optimal layout. In one embodiment, a simulated annealing method is used as a randomized search algorithm for determining the optimal layout.

The constraints may be divided into two sets: hard constraints and soft constraints. Hard constraints consist of characteristics required of any acceptable layout and therefore hard constraints bound the space of possible layouts. In contrast, soft constraints consist of characteristics desired in the final layout but not required. The hard constraints are typically imposed through the perturb function which is designed to only generate layouts that meet the hard constraints. The score function checks how well a given layout achieves the soft constraints.

Using the algorithm, a set of data may be used to automatically populate a chart with labels while optimizing the position of the labels in the chart area.

Figure 2:
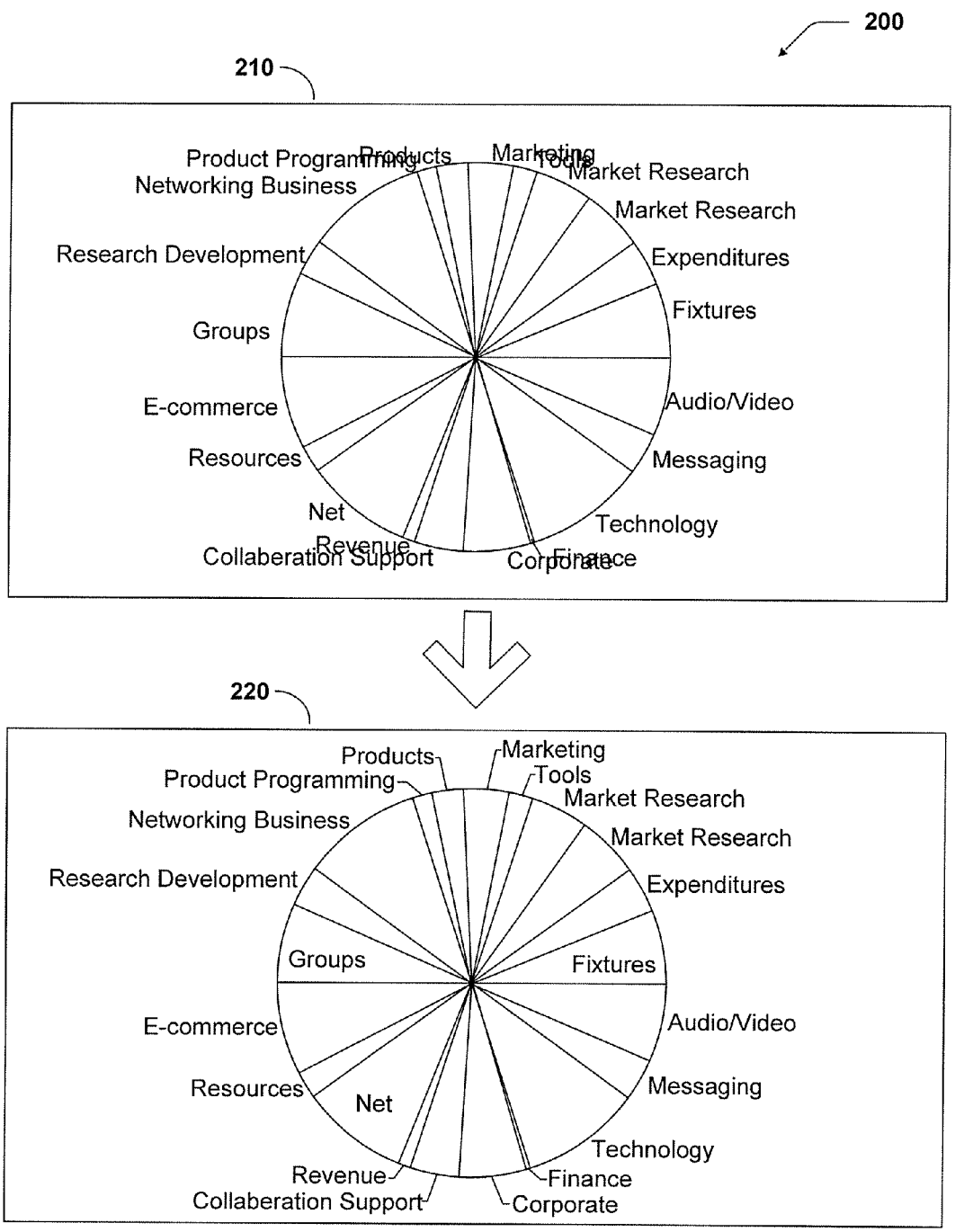
FIG. 2 illustrates exemplary views of a pie chart with automatic labeling before and after label position optimization in accordance with the present invention.

FIG. 2 illustrates exemplary views 200 of a pie chart with automatic labeling before and after label position optimization in accordance with the present invention.

View 210 illustrates that the labels on the pie chart are overlapping due to the number of data points included in the pie chart. The overlapping text makes it difficult to visually discern the labels and their association with the elements of the pie chart.

View 220 results in a pie chart with improved labeling by running the optimization algorithm of the present invention. The readability of the pie chart is greatly improved by optimizing the position of the labels within the chart space. The algorithm has moved certain labels away from the anchors (slices) to which they are related, while others have been moved closer or even centered, or partially centered, within their anchors. Other labels have had lead line added to visually link the label with their associated anchor. View 220 illustrates that the algorithm uses various methods for providing the optimal layout for the labels of the chart.

Figure 3:
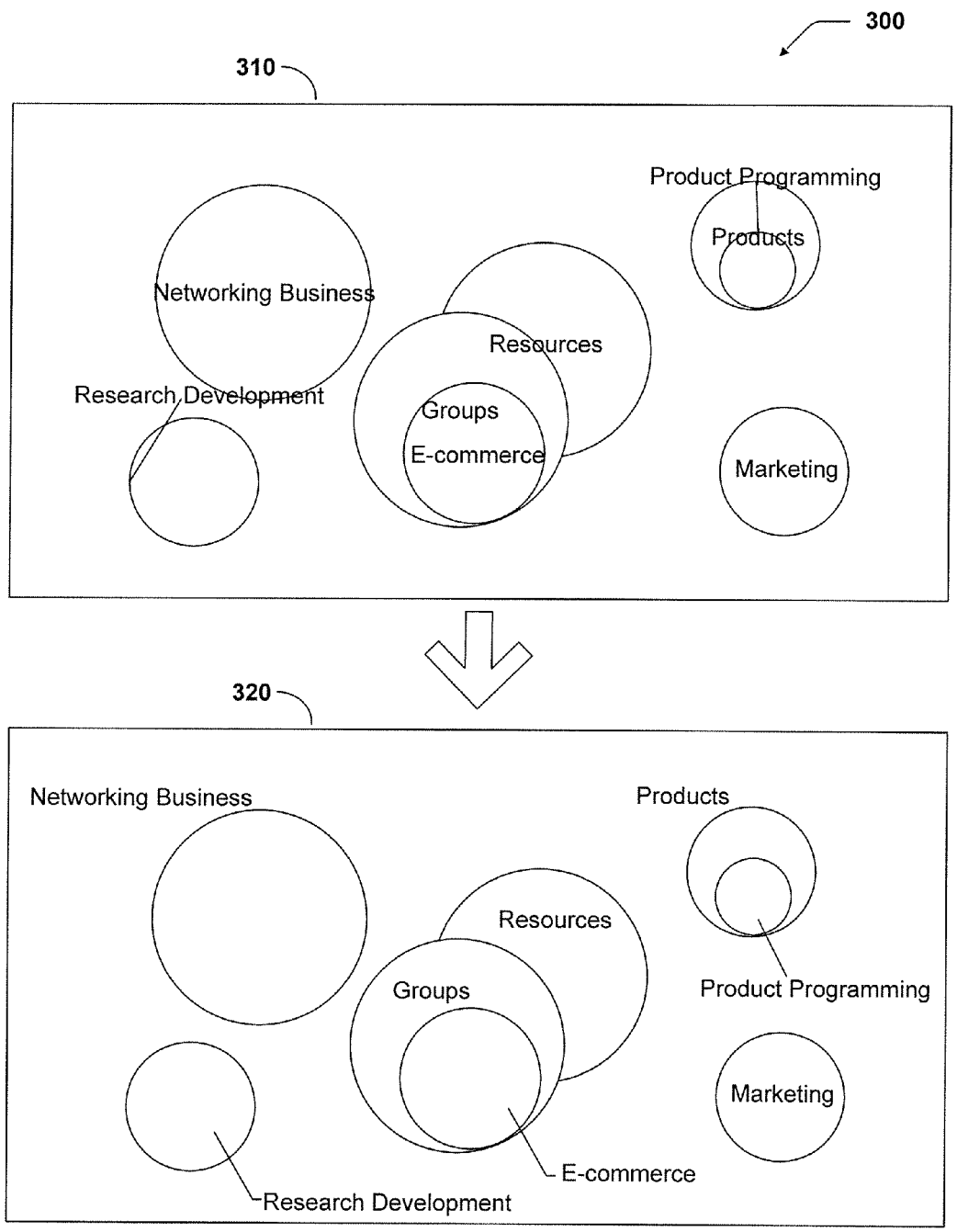
FIG. 3 illustrates exemplary views of a bubble chart with automatic labeling before and after label position optimization in accordance with the present invention.

FIG. 3 illustrates exemplary views 300 of a bubble chart with automatic labeling before and after label position optimization in accordance with the present invention.

View 310 illustrates that the labels on the bubble chart may be positioned such that determining their related anchors may not be possible. Furthermore, the text of the labels may not be positioned for optimal viewing of the bubbles within the chart, with text that overlaps the bubble edges.

View 320 is a bubble chart with improved labeling by running the optimization algorithm of the present invention. The readability of the bubble chart is greatly improved by optimizing the position of the labels within the chart space. The algorithm has moved certain labels away from the anchors (bubbles) to which they are related, while others have been moved closer or even centered, or partially centered, within their anchors. Other labels have had lead line added to visually link the label with their associated anchor while moving the label a distance away from its associated anchor. View 320 illustrates that the algorithm uses various methods for providing the optimal layout for the labels of a bubble chart similar to the various method employed for the pie chart.

Figure 4:
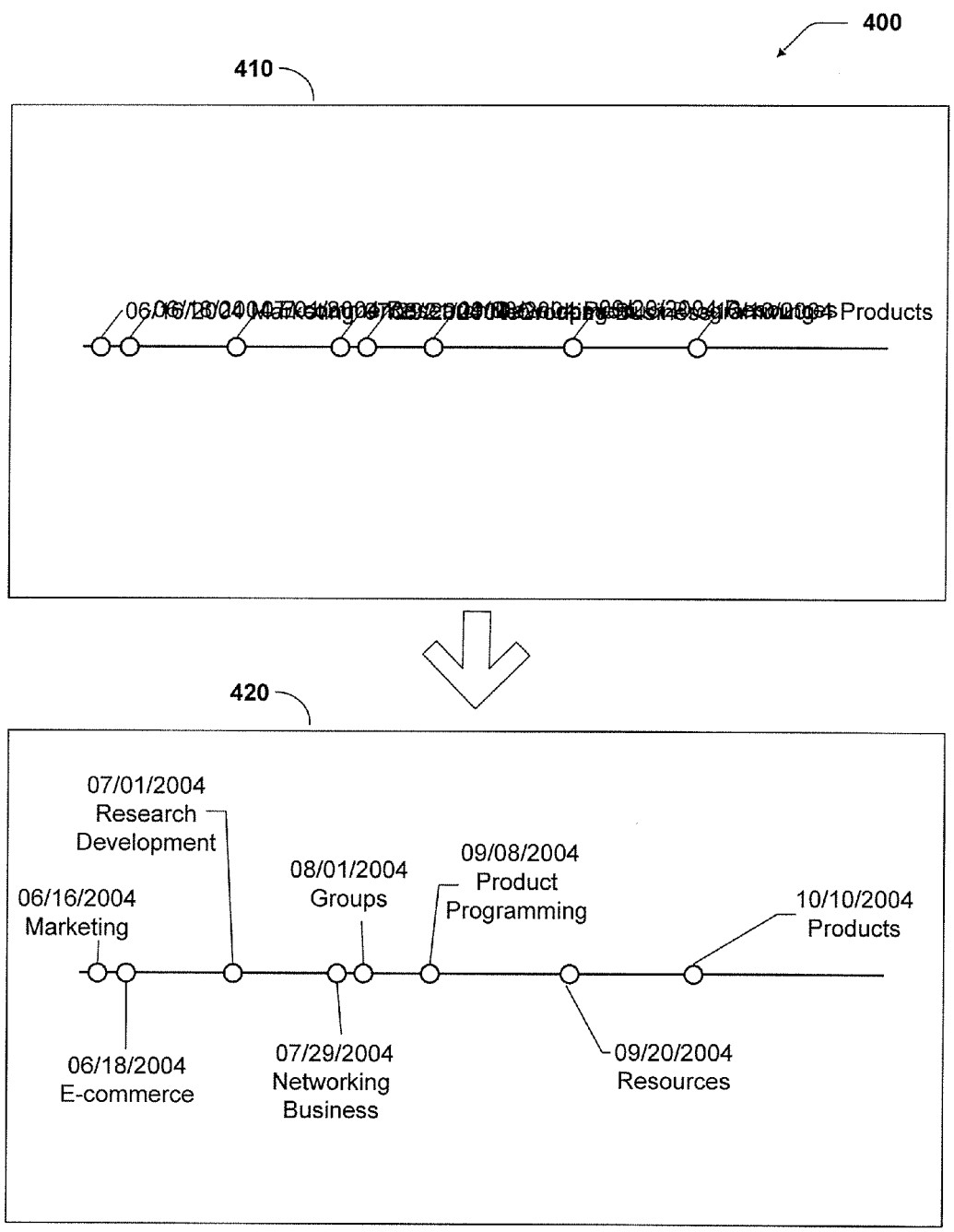
FIG. 4 illustrates exemplary views of a timeline chart with automatic labeling before and after label position optimization in accordance with the present invention.

FIG. 4 illustrates exemplary views 400 of a timeline chart with automatic labeling before and after label position optimization an accordance with the present invention.

View 410 illustrates that the labels on the timeline chart are overlapping due to the number of data points included in the space provided. Furthermore, the automated labeling algorithm without the benefit of the present invention is not intelligent enough to vary the spacing of the text from the data points on the timeline.

View 420 is a timeline chart with improved labeling by running the optimization algorithm of the present invention. The readability of the timeline is greatly improved by optimizing the position of the labels within the chart space. The algorithm has changed the text format and moved the labels throughout the chart space to optimize the use of the chart space. View 420 illustrates that the algorithm uses various methods for providing the optimal layout for the labels of a runeline chart similar to the various method employed for the pie chart and bubble chart examples provided above.

Embodiments other than the embodiments shown in FIGS. 2-4 may be provided in accordance with the present invention. For example, the present invention may be used optimize the position of labels on a line graph, within a photograph, or in conjunction with other visual data objects.

Figure 5:
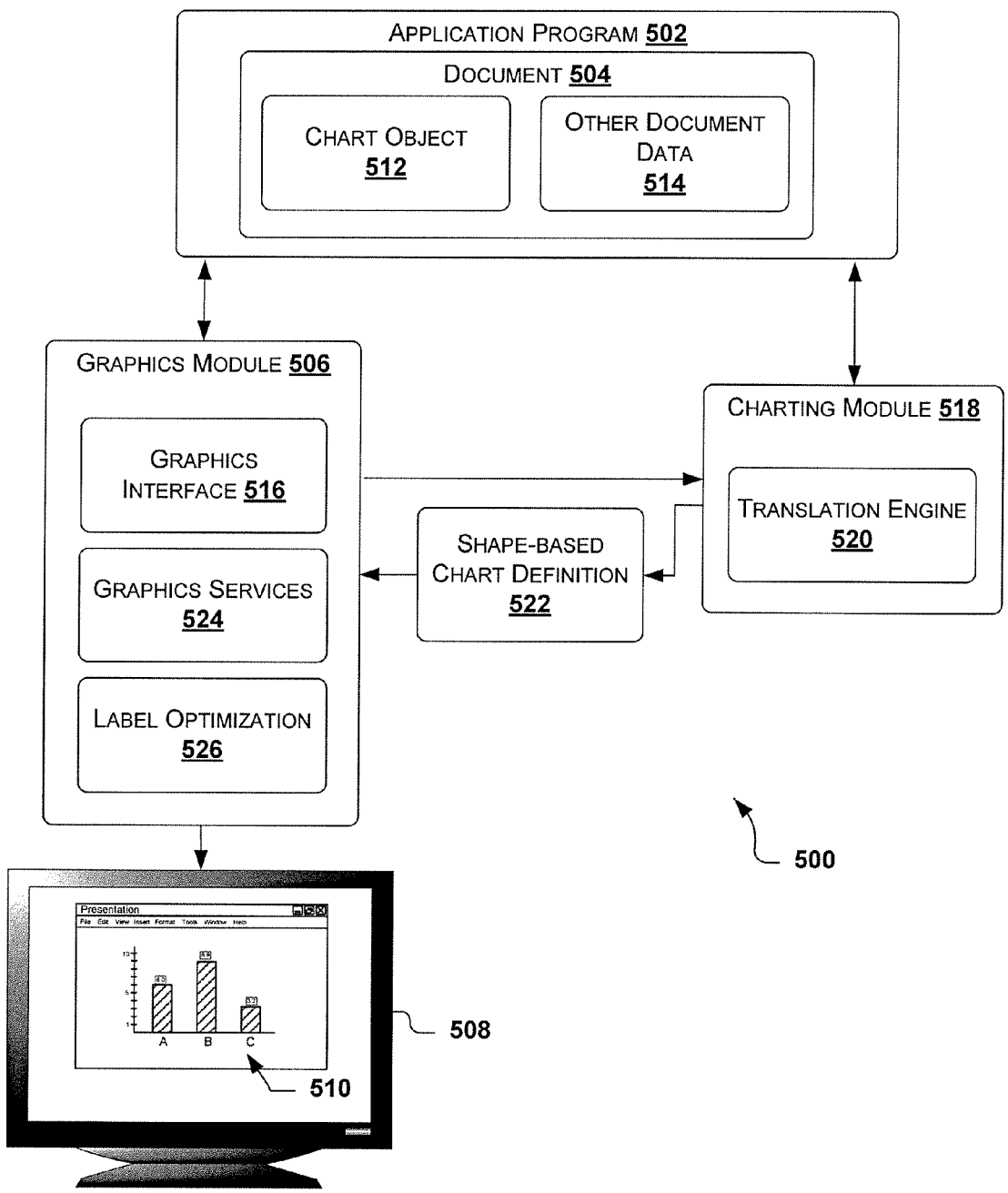
FIG. 5 illustrates an exemplary charting system for carrying out generating a chart and optimizing the label position in accordance with the present invention.

FIG. 5 illustrates an exemplary charting system 500 for carrying out generating a chart and optimizing the label position in accordance with the present invention. Included in system 500 are application program 502 that provides access to document 504 and graphics module 506 for rendering document 504 on computer monitor screen 508.

As used herein, document 504 is a computer-readable file that includes user-readable information, such as text and graphics. Document 504 may be viewed and edited by a user through a user interface of the application program 502. Exemplary types of documents include, but are not limited to, a spreadsheet, a presentation, or a conventional text document. Thus, depending on the type of document, application program 502 may be, for example, but not limited to, MICROSOFT "WORD", "POWERPOINT", "EXCEL", or other application program. By way of example, as shown on screen 508, document 504 is a 'Presentation,' which is often, but not always, associated with "POWERPOINT".

Particularly relevant to the present description is chart 510 in the presentation. Chart 510 shown in the particular implementation of FIG. 1 is a column chart. In accordance with other implementations, chart 510 is not limited to a column chart, but can be any other type of chart, such as, but not limited to, a pie chart, a line chart, a scatter plot, a photograph, or other visual data objects. The various data in chart 510 is originally specified by document 504. Document 504 specifies chart 510 with a chart definition called chart object 512.

Chart object 512 defines the chart 510 in terms of chart elements. Generally, a chart element is a data unit representing an aspect of a chart. Typically a chart element represents an aspect of the chart in relation to the information that the chart conveys or the type of chart. Exemplary chart elements include bars (e.g., for a bar chart), chart axis, chart legends, chart titles, chart labels, element colors, text fonts, element locations, data sources and so on. Chart elements may be referred to as anchors with relation to a label. One implementation of chart object 512 is a set of extensible markup language (XML). To illustrate, an example XML from chart object 512 is shown below:

```
- <c:Chart xmlns:c="chart" xmlns:s="shape">
    - <c:Scaling>
        <c:ScaleID>0</c:ScaleID>
        <c:Orientation>MinMax</c:Orientation>
    </c:Scaling>
    - <c:Scaling>
        <c:ScaleID>1</c:ScaleID>
        <c:Orientation>MinMax</c:Orientation>
    </c:Scaling>
    <c:Name>Chart 1</c:Name>
    - <c:PlotArea>
        <c:Shape />
    - <c:Graph>
        <c:Type>Column</c:Type>
        <c:SubType>Clustered</c:SubType>
        <c:Overlap>0</c:Overlap>
        <c:ScaleID>0</c:ScaleID>
        <c:ScaleID>1</c:ScaleID>
    - <c:Series>
```

-continued

```
        <c:Index>0</c:Index>
        <c:Name>Series 1</c:Name>
      - <c:Shape>
        - <s:Fill>
          - <s:Pattern>
              <s:Title>Wide upward diagonal</s:Title>
              <s:Color>black</s:Color>
              <s:Color2>white</s:Color2>
            </s:Pattern>
          </s:Fill>
        - <s:Border>
            <s:Weight>0</s:Weight>
            <s:Solid>black</s:Solid>
          </s:Border>
        </c:Shape>
      - <c:DataLabels>
        - <c:Shape>
          - <s:Font>
              <s:FontName>Arial</s:FontName>
              <s:Size>18</s:Size>
              <s:AutoScale />
            </s:Font>
          </c:Shape>
        - <c:Number>
            <c:FormatString>0.0</c:FormatString>
          </c:Number>
          <c:ShowValue />
        </c:DataLabels>
      - <c:Category>
            <c:DataSource>0</c:DataSource>
            <c:Data>Sheet1!$A$1:$A$3</c:Data>
        </c:Category>
      - <c:Value>
            <c:DataSource>0</c:DataSource>
            <c:Data>Sheet1!$B$1:$B$3</c:Data>
        </c:Value>
      </c:Series>
      <c:PlotVisible />
    </c:Graph>
  - <c:Axis>
        <c:Placement>Bottom</c:Placement>
        <c:AxisID>0</c:AxisID>
        <c:ScaleID>0</c:ScaleID>
        <c:CrossingAxis>1</c:CrossingAxis>
      - <c:Shape>
        - <s:Font>
            <s:FontName>Arial</s:FontName>
            <s:Size>18</s:Size>
            <s:AutoScale />
          </s:Font>
        </c:Shape>
      - <c:Number>
            <c:SourceLinked />
            <c:BuiltInFormat>0</c:BuiltInFormat>
        </c:Number>
        <c:MajorTick>None</c:MajorTick>
        <c:TickMarkSkip>1</c:TickMarkSkip>
        <c:Type>Automatic</c:Type>
    </c:Axis>
  - <c:Axis>
        <c:Placement>Left</c:Placement>
        <c:AxisID>1</c:AxisID>
        <c:ScaleID>1</c:ScaleID>
        <c:CrossingAxis>0</c:CrossingAxis>
        <c:CrossesAt>Minimum</c:CrossesAt>
        <c:CrossBetween>Between</c:CrossBetween>
      - <c:Shape>
        - <s:Font>
            <s:FontName>Arial</s:FontName>
            <s:Size>18</s:Size>
            <s:AutoScale />
          </s:Font>
        </c:Shape>
      - <c:Number>
            <c:SourceLinked />
            <c:BuiltInFormat>0</c:BuiltInFormat>
        </c:Number>
        <c:MajorTick>Cross</c:MajorTick>
        <c:MinorTick>Cross</c:MinorTick>
```

-continued

```
        <c:Type>Value</c:Type>
        <c:MajorUnit>5</c:MajorUnit>
      </c:Axis>
    </c:PlotArea>
  </c:Chart>
```

Document 504 typically also has other document data 514, which includes, but is not limited to, text and formatting information. In accordance with one implementation, when application program 502 is launched and document 504 is opened, chart object 512 is passed to graphics interface 516 of graphics module 506 for rendering.

Graphics interface 516 determines what type of graphic is represented by the chart object 512. Types of graphics that may be handled by the graphics interface 516 include, but are not limited to, diagrams, charts, or arbitrary shapes. Chart object 512 includes an identifier that indicates that it defines a chart. Based on the chart identifier, graphics interface 516 determines that chart object 512 defines a chart and sends it to charting module 518.

Charting module 518 includes translation engine 520 that translates Chart object 512 into a form that graphics module 506 uses for rendering chart 510 to screen 508. Specifically, translation engine 520 translates chart object 512 into shape-based chart definition 522. As its name suggests, shape-based chart definition 522 defines the chart in terms of shapes, rather than chart elements. Use of shapes can improve the chart rendering process, chart appearance, and chart manipulation, by allowing for a mechanism for interacting with graphics.

In the translation process, translation engine 520 performs a number of operations. For example, translation engine 520 retrieves data (e.g., numerical data) that makes up chart 510 from data source(s) referenced in chart object 512. The data source(s) may be document 504 itself, or some other source, such as, but not limited to, another document, a database, a file, the Internet, or a queue. In addition to the data, translation engine 520 may retrieve numerical formatting information that describes how the data is formatted. Numerical formatting information includes, but is not limited to a currency symbol, number of decimal points, percentage or fraction format, or date and time format.

Translation engine 520 also translates the chart elements into shapes, such as lines, rectangles, circles, triangles, and so on. A shape is a data unit that simply represents the visual appearance of a chart element and is not tied to, or reliant upon, the underlying numerical chart data. Thus, for example, a bar in chart object 512 will be translated into a rectangle in shape-based chart definition 522; a chart axis will be translated into a line, and so on.

In addition, translation engine 520 groups selected related shapes to facilitate manipulation of related shapes by the user. Graphics interface 516 provides functions that allow a user to interact with groups of related shapes. Translation engine 520 takes advantage of those functions by grouping related chart elements such as, but not limited to, related data labels and related data series. After retrieving the data, translating chart elements into shapes, and grouping related shapes, translation engine 520 generates shape-based chart definition 522.

An implementation of the shape-based chart definition 522 is composed of XML code. To illustrate, XML code from an exemplary shape-based chart definition 522 is shown below:

```
- <group>
    <id>Chart</id>
  - <shapes>
    - <rect>
        <id>ChartArea</id>
        <style>margin-left:0;margin-top:9.75pt;width:501pt;height:319.5pt;z-index:1</style>
      - <border>
          <Solid>black</Solid>
          <Weight>0</Weight>
        </border>
      </rect>
    - <group>
        <id>Series 1</id>
        <style>margin-left:88.5pt;margin-top:60pt;width:359.25pt;height:220.5pt;z-index:3</style>
        <coordorigin>438,743</coordorigin>
        <coordsize>479,294</coordsize>
      - <Fill>
        - <Pattern>
            <Title>Wide upward diagonal</Title>
            <Color>black</Color>
            <Color2>white</Color2>
          </Pattern>
        </Fill>
      - <border>
          <Solid>black</Solid>
          <Weight>0</Weight>
        </border>
      - <shapes>
        - <rect>
            <id>Point 1</id>
            <style>left:438;top:839;width:80;height:198</style>
          </rect>
        - <rect>
            <id>Point 2</id>
            <style>left:638;top:743;width:80;height:294</style>
          </rect>
        - <rect>
            <id>Point 3</id>
            <style>left:837;top:931;width:80; height:106</style>
          </rect>
        </shapes>
      </group>
    - <group>
        <id>Y Axis</id>
      - <border>
          <Solid>black</Solid>
          <Weight>0</Weight>
        </border>
      - <shapes>
        - <line>
            <id>Y Axis Line</id>
            <style>z-index:4</style>
            <from>45pt,32.25pt</from>
            <to>45pt,280.5pt</to>
          </line>
        - <line>
            <id>Y Axis Tick Mark 1</id>
            <style>z-index:5</style>
            <from>40pt,281pt</from>
            <to>48pt,281pt</to>
          </line>
        - <line>
            <id>Y Axis Tick Mark 2</id>
            <style>z-index:6</style>
            <from>40pt,256pt</from>
            <to>48pt,256pt</to>
          </line>
        - <line>
            <id>Y Axis Tick Mark 3</id>
            <style>z-index:7</style>
            <from>40pt,231pt</from>
            <to>48pt,231pt</to>
          </line>
        - <line>
            <id>Y Axis Tick Mark 4</id>
            <style>z-index:8</style>
            <from>40pt,207pt</from>
```

-continued

```
      <to>48pt,207pt</to>
    </line>
  - <line>
      <id>Y Axis Tick Mark 5</id>
      <style>z-index:9</style>
      <from>40pt,182pt</from>
      <to>48pt,182pt</to>
    </line>
  - <line>
      <id>Y Axis Tick Mark 6</id>
      <style>z-index:10</style>
      <from>40pt,157pt</from>
      <to>48pt,157pt</to>
    </line>
  - <line>
      <id>Y Axis Tick Mark 7</id>
      <style>z-index:11</style>
      <from>40pt,132pt</from>
      <to>48pt,132pt</to>
    </line>
  - <line>
      <id>Y Axis Tick Mark 8</id>
      <style>z-index:12</style>
      <from>40pt,108pt</from>
      <to>48pt,108pt</to>
    </line>
  - <line>
      <id>Y Axis Tick Mark 9</id>
      <style>z-index:13</style>
      <from>40pt,83pt</from>
      <to>48pt,83pt</to>
    </line>
  - <line>
      <id>Y Axis Tick Mark 10</id>
      <style>z-index:14</style>
      <from>40pt,57pt</from>
      <to>48pt,57pt</to>
    </line>
  - <line>
      <id>Y Axis Tick Mark 11</id>
      <style>z-index:15</style>
      <from>40pt,33pt</from>
      <to>48pt,33pt</to>
    </line>
  - <line>
      <id>Y Axis Tick Mark 12</id>
      <style>z-index:16</style>
      <from>38.25pt,281pt</from>
      <to>49.5pt,281pt</to>
    </line>
  - <line>
      <id>Y Axis Tick Mark 13</id>
      <style>z-index:17</style>
      <from>38.25pt,157pt</from>
      <to>49.5pt,157pt</to>
    </line>
  - <line>
      <id>Y Axis Tick Mark 14</id>
      <style>z-index:18</style>
      <from>38.25pt,33pt</from>
      <to>49.5pt,33pt</to>
    </line>
    </shapes>
    </group>
  - <line>
      <id>X Axis</id>
      <style>z-index:19</style>
      <from>44.25pt,281pt</from>
      <to>492.75pt,281pt</to>
  - <border>
      <Solid>black</Solid>
      <Weight>0</Weight>
    </border>
    </line>
  - <group>
      <id>Series 1 DataLabels</id>
      <style>margin-left:106.5pt;margin-
top:33pt;width:324pt;height:164.25pt;z-index:20</style>
      <coordorigin>462,707</coordorigin>
      <coordsize>432,219</coordsize>
  - <Font>
      <FontName>Arial</FontName>
      <Size>18</Size>
      <AutoScale />
    </Font>
  - <shapes>
  - <rect>
      <id>Series 1 DataLabel 1</id>
      <style>left:462; top:803;width:33; height:31;wrap-style:none;text-anchor:top</style>
  - <textbox style="fit-shape-to-text:t" inset="0,0,0,0">
      <div style="text-align:left">6.0</div>
    </textbox>
    </rect>
  - <rect>
      <id>Series 1 DataLabel 2</id>
      <style>left:661;top:707; width:33;height:31;wrap-style:none;text-anchor:top</style>
  - <textbox style="fit-shape-to-text:t" inset="0,0,0,0">
      <div style="text-align:left">8.9</div>
    </textbox>
    </rect>
  - <rect>
      <id>Series 1 DataLabel 3</id>
      <style>left:861;top:895; width:33;height:31;wrap-style:none;text-anchor:top</style>
  - <textbox style="fit-shape-to-text:t" inset="0,0,0,0">
      <div style="text-align:left">3.2</div>
    </textbox>
    </rect>
    </shapes>
    </group>
  - <group>
      <id>Y Axis Labels</id>
      <style>margin-left:10.5pt;margin-
top:22.5pt;width:19.5pt;height:271.5pt;z-index:21</style>
      <coordorigin>334,693</coordorigin>
      <coordsize>26,362</coordsize>
  - <Font>
      <FontName>Arial</FontName>
      <Size>18</Size>
      <AutoScale />
    </Font>
  - <shapes>
  - <rect>
      <id>Y Axis Labels 0</id>
      <style>left:347;top:1024; width:13;height:31;wrap-style:none;text-anchor:top</style>
  - <textbox style="fit-shape-to-text:t" inset="0,0,0,0">
      <div style="text-align:left">0</div>
    </textbox>
    </rect>
  - <rect>
      <id>Y Axis Labels 5</id>
      <style>left:347;top:858; width:13;height:31;wrap-style:none;text-anchor:top</style>
  - <textbox style="fit-shape-to-text:t" inset="0,0,0,0">
      <div style="text-align:left">5</div>
    </textbox>
    </rect>
  - <rect>
      <id>Y Axis Labels 10</id>
      <style>left:334;top:693; width:26;height:31;wrap-style:none;text-anchor:top</style>
      stroked="f">
  - <textbox style="fit-shape-to-text:t" inset="0,0,0,0">
      <div style="text-align:left">10</div>
    </textbox>
    </rect>
    </shapes>
    </group>
  - <group>
      <id>X Axis Labels</id>
      <style>margin-left:112.5pt;margin-
top:296.25pt;width:312pt;height:23.25pt; z-index:22</style>
      <coordorigin>470,1058</coordorigin>
      <coordsize>416,31</coordsize>
  - <shapes>
```

-continued

```
- <rect>
    <id>X Axis Labels Category 1</id>
    <style>left:470;top:1058; width:15;height:31;wrap-style:none;text-anchor:top</style>
- <textbox style="fit-shape-to-text:t" inset="0,0,0,0">
    <div style="text-align:left">A</div>
    </textbox>
    </rect>
- <rect>
    <id>X Axis Labels Category 2</id>
    <style>left:670;top:1058; width:16;height:31;wrap-style:none;text-anchor:top</style>
- <textbox style="fit-shape-to-text:t" inset="0,0,0,0">
    <div style="text-align:left">B</div>
    </textbox>
    </rect>
- <rect>
    <id>X Axis Labels Category 3</id>
    <style>left:869;top:1058; width:17;height:31;wrap-style:none;text-anchor:top</style>
- <textbox style="fit-shape-to-text:t" inset="0,0,0,0">
    <div style="text-align:left">C</div>
    </textbox>
    </rect>
    </shapes>
    </group>
    </shapes>
    </group>
```

Graphics interface 516 receives shape-based chart definition 522 and renders chart 510 on screen 508 as a set of shapes specified by the shape-based chart definition. Graphics interface 516 typically performs the rendering by making calls to operating system or display controller functions. For example, in the WINDOWS operating system, graphics interface 516 may make calls to the graphics display interface (GDI+).

As shown, graphics module 506 includes a set of graphics services 524. Graphics services 524 include services accessible by the application program for manipulating chart 510. Graphics services 524 provide one or more application programming interface(s) (API) to access the services.

Because graphics module 506 renders shapes, graphics services 524 are able to offer high-level functions for manipulating chart 510. Graphics services 524 can, for example, perform vector-graphics functions on shapes within the chart. To illustrate, a rectangle can be moved easily by calling a single function of graphics services 524 that moves a shape, rather than calling numerous low-level functions to redraw the rectangle in a new location. In addition, graphics module 506 is common to multiple application programs, so that shape manipulation/editing and appearance will be consistent among the application programs. Thus, graphics module 506 can present a graphics user interface for editing shapes in chart 510, regardless of the type of application program 502.

Label Optimization 526 is the code directed to the present invention within system 500. Label Optimization 526 receives shape-based chart definition 522 and optimizes the position of the labels according to the optimization algorithm. As previously stated, shape-based chart definition 522 allows the labels to be easily moved since they are defined by their shape rather than by other low-level functions that would require the labels to be redrawn. Label Optimization 526 may be utilized before or after chart 510 is rendered on screen 508 to optimize the positioning of the labels. For example, positioning of the labels according to the optimization algorithm may be automatic for every chart rendered. In contrast, optimization of the labels may be provided according to a user selection, where the user affirmatively selects to have the labels optimized. In one embodiment, labels that are manually positioned by the user are ignored during the optimization process.

The term module is used in a general sense to describe a component that is operable to perform one or more designated functions. A module may be implemented in various ways and forms. For example, a module may be implemented in or as hardware, software, firmware, or in various combinations of hardware, software, and/or firmware, depending on such factors as speed, cost, size, etc. For example, and without limitation, in one implementation each of the modules in the system 100 comprises software, such as a dynamic link library (DLL), that is stored on a computer-readable medium and executed on a computing system, such as the computing system described above with respect to FIG. 1.

FIG. 6 illustrates exemplary pseudo-code for determining the layout of a visual data object that corresponds to the optimal layout of the labels in accordance with the present invention.

Implementing exemplary algorithm 600 requires the specification of different functions. The InitializeLayout( ) function defines the initial placement for each of the visual elements and thereby provides a starting point for the search. The PerturbLayout( ) function corresponds to the perturb function previously described and provides a method for changing a given layout into a new layout. The RevertLayout( ) function inverts the actions of PerturbLayout( ) to go from the new layout back to the previous layout. The Random( ) function returns a number between 0.0 and 1.0. Finally, the ScoreLayout( ) function, which corresponds to the objective function previously described, computes how close the current layout is to optimal. In one embodiment, the termination condition may vary according to time limits for achieving a usable layout, the proximity of the layout to optimal, and other factors. In another embodiment, scores are defined to be positive and the lower the score the better the layout. Therefore, the goal is to minimize the score according to the constraints used. The score that is acceptable for a layout to be used, depends on the termination condition of the algorithm.

As shown in the pseudo-code, the algorithm accepts all good moves within the search space and, with a probability that is an exponential function of a temperature T, accepts some bad moves as well. As the algorithm progresses, T is annealed (or decreased), resulting in a decreasing probability of accepting bad moves. Accepting bad moves in this manner allows the algorithm to escape local minima in the score function.

The constraints defined for providing the optimal layout of the labels may include constraints such as minimizing the distance from the anchor, minimizing the overlap of the labels, minimizing the overlap with elements, font restrictions, orientation restrictions, and other limitations that affect how a label may be manipulated. Any number of constraints may be fed into the algorithm for manipulating the labels to optimize their position with the viewable space.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for automatically positioning labels associated with a visual data object, comprising:
   determining a first layout for the labels;
   scoring the first layout to determine a first score; wherein the first score represents a combined score for each of the labels in the first layout;
   determining second layout for the labels; wherein the second layout is different than the first layout;
   scoring the second layout to determine a second score; wherein the second score represents a combined score for each of the labels in the second layout;
   comparing the first score with the second score;
   proceeding with one of the first layout and the second layout as a selected layout for rendering the visual data object depending on the comparison of the first score to the second score; and
   rendering the visual data object.

2. The computer-implemented method of claim 1, wherein scoring the first layout to determine a first score further comprises executing an objective function, wherein the objective function provides a goal by which the first layout is scored.

3. The computer-implemented method of claim 2, wherein the goal corresponds to minimizing overlap of the labels.

4. The computer-implemented method of claim 2, wherein the goal corresponds to minimizing the distance from the labels to their associated anchors within a chart.

5. The computer-implemented method of claim 1, wherein scoring the first layout to determine a first score further comprises comparing a score associated with the first layout to another score associated with an optimal layout.

6. The computer-implemented method of claim 5, wherein proceeding with one of the first layout and the second layout further comprises proceeding with the layout that most closely corresponds to an optimal layout.

7. The computer-implemented method of claim 1, wherein determining a second layout for the labels further comprises executing a perturb function, wherein the perturb function alters the first layout according to a set of constraints.

8. The computer-implemented method of claim 7, wherein the perturb function corresponds with adjusting an aspect of a single label included in a chart.

9. The computer-implemented method of claim 1, further comprising repeating multiple iterations of determining an additional layout for the labels and scoring the additional layout until a layout is achieved that approaches an optimal layout.

10. A system for rendering a chart, comprising:
    a display;
    a chart object that is arranged to define the chart with chart elements;
    a graphics module that is operable to render shapes;
    a charting module that is operable to generate a shape-based chart definition based on the chart object, wherein the shape-based chart definition defines the chart with shapes that can be rendered by the graphics module;
    a label optimization that automatically positions labels associated with the chart within the chart according to an optimal layout; wherein the label optimization determines a first layout for the labels and a second layout for the labels; wherein the second layout includes a different position for at least one of the labels as compared to the first layout;
    comparing the first layout with the second layout to determine which layout to render; wherein the comparison includes each of the labels in the first layout and the second layout; and
    using the graphics module to render the visual data object to the display that is one of the first layout or the second layout.

11. The system of claim 10, wherein the label optimization application comprises computer-executable instructions for:
    determining the first layout for the labels;
    scoring the first layout to determine a first score;
    determining a second layout for the labels;
    scoring the second layout to determine a second score;
    comparing the first score with the second score; and
    proceeding with one of the first layout and the second layout as a selected layout for rendering the visual data object depending on the comparison of the first score to the second score.

12. The system of claim 11, wherein scoring the first layout to determine a first score further comprises executing an objective function, wherein the objective function provides a goal by which the first layout is scored.

13. The system of claim 11, wherein scoring the first layout to determine a first score further comprises comparing a score associated with the first layout to another score associated with an optimal layout.

14. The system of claim 11, wherein determining a second layout for the labels further comprises executing a perturb function, wherein the perturb function alters the first layout according to a set of constraints.

15. The system of claim 11, further comprising repeating multiple iterations of determining an additional layout for the labels and scoring the additional layout until a layout is achieved that approaches an optimal layout.

16. A computer-readable storage medium encoded with computer-executable instructions automatically positioning labels associated with a visual data object, the instructions comprising:
    determining a first layout for the labels;
    scoring the first layout to determine a first score; wherein the first score represents a combined score for each of the labels in the first layout;
    determining a second layout for the labels; wherein the second layout is different than the first layout and wherein the second layout includes a different position for at least one of the labels as compared to the first layout;
    scoring the second layout to determine a second score; wherein the second score represents a combined score for each of the labels in the first layout;
    comparing the first score with the second score;
    proceeding with one of the first layout and the second layout as a selected layout for rendering the visual data object depending on the comparison of the first score to the second score; and
    rendering the visual data object.

17. The computer-readable medium of claim 16, wherein scoring the first layout to determine a first score further comprises executing an objective function, wherein the objective function provides a goal by which the first layout is scored.

18. The computer-readable medium of claim 16, wherein scoring the first layout to determine a first score further comprises comparing a score associated with the first layout to another score associated with an optimal layout.

19. The computer-readable medium of claim 18, wherein proceeding with one of the first layout and the second layout further comprises proceeding with the layout that most closely corresponds to an optimal layout.

20. The computer-readable medium of claim 16, wherein determining a second layout for the labels further comprises executing a perturb function, wherein the perturb function alters the first layout according to a set of constraints.

21. The computer-readable medium of claim 16, further comprising repeating multiple iterations of determining an additional layout for the labels and scoring the additional layout until a layout is achieved that approaches an optimal layout.

* * * * *